(12) United States Patent
El-Shimi et al.

(10) Patent No.: US 9,495,552 B2
(45) Date of Patent: Nov. 15, 2016

(54) INTEGRATED DATA DEDUPLICATION AND ENCRYPTION

(71) Applicant: MICROSOFT TECHNOLOGY LICENSING, LLC, Redmond, WA (US)

(72) Inventors: Ahmed Moustafa El-Shimi, Seattle, WA (US); Paul Adrian Oltean, Redmond, WA (US); Ran Kalach, Bellevue, WA (US); Sudipta Sengupta, Redmond, WA (US); Jin Li, Bellevue, WA (US); Roy D'Souza, Bellevue, WA (US); Omkant Pandey, Austin, TX (US); Ramarathnam Venkatesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 13/731,746

(22) Filed: Dec. 31, 2012

(65) Prior Publication Data

US 2014/0189348 A1   Jul. 3, 2014

(51) Int. Cl.
*H04L 9/00* (2006.01)
*G06F 21/62* (2013.01)
*H04L 29/06* (2006.01)

(52) U.S. Cl.
CPC ....... *G06F 21/6218* (2013.01); *H04L 63/0428* (2013.01); *G06F 2221/2107* (2013.01)

(58) Field of Classification Search
USPC .......... 713/156, 165, 167, 168, 189; 380/44; 726/7
See application file for complete search history.

(56) References Cited

U.S. PATENT DOCUMENTS

| | | | |
|---|---|---|---|
| 8,380,681 B2 * | 2/2013 | Oltean | G06F 17/3007 707/692 |
| 2002/0150240 A1 * | 10/2002 | Henson | H04L 9/0618 380/44 |
| 2006/0080284 A1 * | 4/2006 | Masonis | G06F 21/6245 |
| 2008/0184350 A1 * | 7/2008 | Chu | G06F 21/10 726/7 |
| 2009/0024480 A1 * | 1/2009 | Dai | G06Q 30/02 705/14.5 |
| 2009/0132811 A1 * | 5/2009 | Koster | G06F 21/10 713/156 |
| 2010/0106972 A1 * | 4/2010 | Melen | H04L 63/06 713/171 |
| 2012/0158672 A1 * | 6/2012 | Oltean | G06F 17/30091 707/692 |
| 2012/0204024 A1 * | 8/2012 | Augenstein | G06F 11/1453 713/150 |
| 2013/0305039 A1 * | 11/2013 | Gauda | G06F 21/6218 713/153 |
| 2014/0025948 A1 * | 1/2014 | Bestler | H04L 9/0863 713/167 |
| 2014/0032925 A1 * | 1/2014 | Panchbudhe | G06F 3/0608 713/189 |
| 2014/0040616 A1 * | 2/2014 | Barber | G06F 11/1453 713/168 |
| 2014/0143213 A1 * | 5/2014 | Tal | G06F 17/30156 707/692 |

FOREIGN PATENT DOCUMENTS

WO   WO 2012158654 A2 *  11/2012  ......... G06F 21/6218

* cited by examiner

*Primary Examiner* — Joseph P Hirl
*Assistant Examiner* — Sayed Beheshti Shirazi
(74) *Attorney, Agent, or Firm* — Aneesh Mehta; Kate Drakos; Micky Minhas

(57) ABSTRACT

The subject disclosure is directed towards encryption and deduplication integration between computing devices and a network resource. Files are partitioned into data blocks and deduplicated via removal of duplicate data blocks. Using multiple cryptographic keys, each data block is encrypted and stored at the network resource but can only be decrypted by an authorized user, such as domain entity having an appropriate deduplication domain-based cryptographic key. Another cryptographic key referred to as a content-derived cryptographic key ensures that duplicate data blocks encrypt to substantially equivalent encrypted data.

20 Claims, 7 Drawing Sheets

INTEGRATED DATA DEDUPLICATION AND ENCRYPTION

BACKGROUND

Organizations typically employ a number of technologies to meet data storage demands, including local storage devices, enterprise storage networks and cloud-based storage services. As each organization grows, reducing total storage space is a substantial concern. Data deduplication generally refers to detecting, uniquely identifying and eliminating redundant data blocks and thereby reducing the physical amount of bytes of data that need to be stored on disk or transmitted across a network. Implementing data deduplication results in considerable savings in the amount of bytes which need to be stored and/or transferred between storage devices.

At the same time, users want their data inaccessible to others, and thus storage of encrypted data is desirable, especially on cloud-based storage services where the users cannot prevent access by others. Because conventional encryption schemes randomize file data such that each data block corresponds to a certain output, it is difficult to determine if a data block within an encrypted file is a duplicate of another encrypted data block. Implementing such an encryption scheme, therefore, hinders effective data deduplication and vice versa. Deduplicating encrypted data is not practical without implementing cumbersome access control mechanisms for each encrypted file sharing duplicate data. Even though convergent encryption technologies provide a workable deduplication system that also encrypts data, each user, regardless of permission, has an encryption key to each file, which renders impractical the prevention of unauthorized access through encryption. Hence, a storage technology's data deduplication capabilities is restricted by security concerns.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards deduplicating files into non-redundant data blocks prior to encrypting these data blocks such that both deduplication and encryption are combined into one mechanism. In one aspect, a number of cryptographic keys are employed to encrypt a data block, preventing an untrusted resource from reasonably deciphering that data block while enabling identification of a duplicate data block, for the purposes of deduplication.

Deduplication using duplicate data blocks may be limited to finding duplicate data blocks only within the same domain. A domain refers to a deduplication group, for instance, a group of entities using computing devices, in which each deduplication group is separated from other groups and provided a private hosted service referred to herein as a deduplication service. In one aspect, a deduplication domain-based cryptographic key defines a scope of the deduplication and encryption integration to ensure only entities belonging to a particular domain can view each other's data and an adversary outside of that particular domain cannot view any encrypted data. If duplicate data blocks originated from a same domain, encrypting these data blocks using such a key results in identical data blocks that can be differentiated from duplicate data blocks from different domains. In one aspect, a content-derived cryptographic key ensures that only duplicate data blocks encrypt to substantially equivalent data. Hence, deduplication and encryption compatibility is achieved using a combination of a content-derived cryptographic key and a deduplication domain-based cryptographic key. Thus, without the combined cryptographic key, the adversary cannot generate a lookup hash value to query the deduplication service as the existence of any data block from another domain.

A network resource is configured to store the non-redundant data blocks, while encrypted, for a number of domains, by encrypting file data for one domain with a different deduplication domain-based cryptographic key than another domain. In one aspect, authentication values, for instance, lookup hash values are computed on the encrypted non-redundant data blocks. For this reason, the deduplication service running on the network resource validates data integrity on encrypted data instead of unencrypted or clear data. Thus, the network resource, including any computing service or device therein, cannot view decrypted file data. In one aspect, the non-redundant data blocks are compressed prior to encryption and/or communication to a network resource for storage, reducing total storage space.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
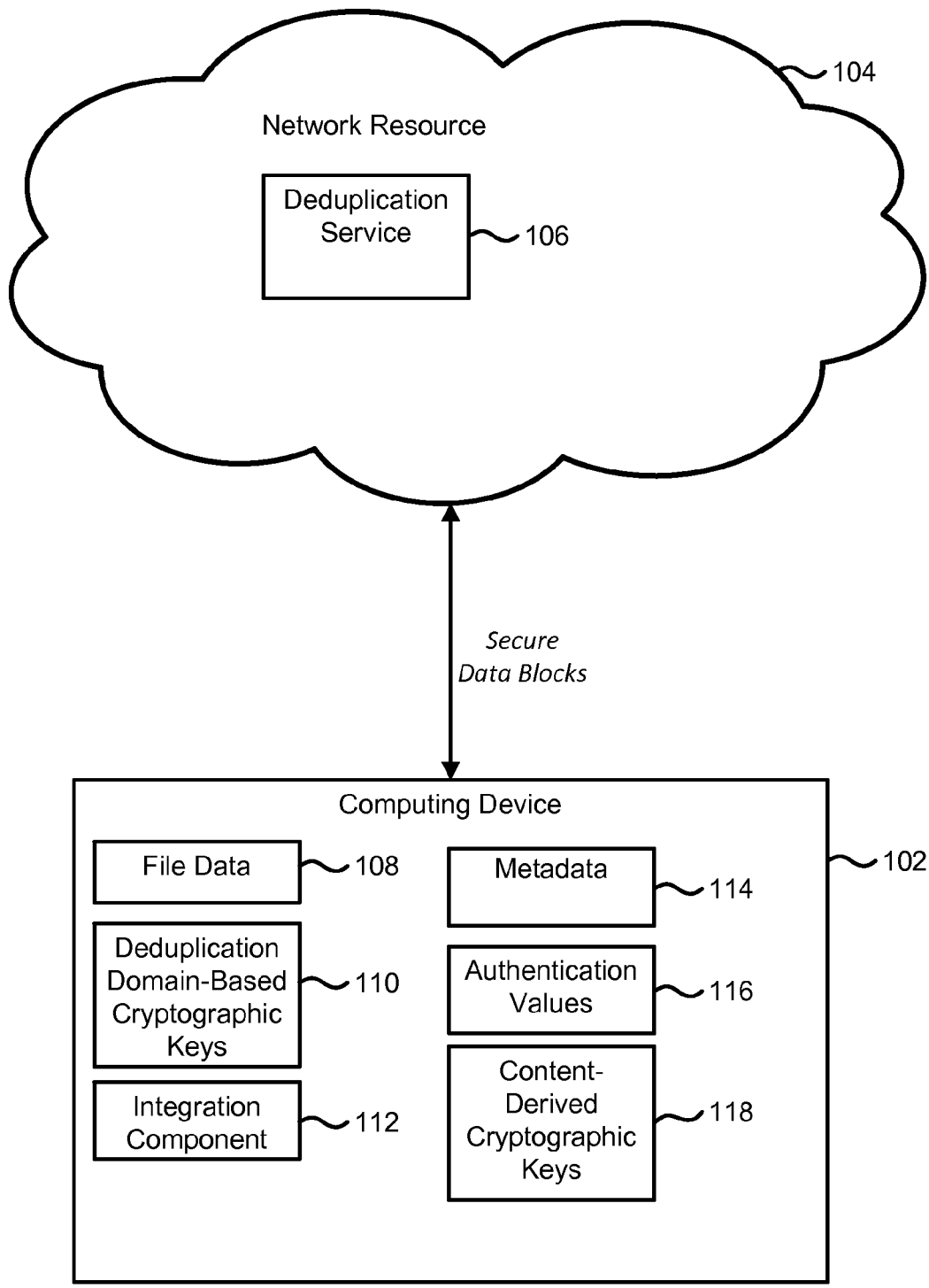
FIG. 1 is a block diagram illustrating an example system for integrated deduplication and encryption according to one example implementation.

Various aspects of the technology described herein are generally directed towards an integrated deduplication and encryption mechanism by which a computing device secures data blocks for storage on a network resource. According to one example implementation, one or more software/hardware components provide interoperability between a deduplication service running on the network resource and an encryption scheme that employs multiple cryptographic keys, including a layered cryptographic key.

One example component uses lookup hash values to identify which data blocks of a given file are duplicates of previously deduplicated data blocks and then, omit any such data block from further compression, communication and/or storage. For each data block, the example component generates a corresponding cryptographic key based upon that data block's content, either directly or indirectly via a hash-based authentication code, and another cryptographic key, which may be a deduplication domain-based cryptographic key. Accordingly, the corresponding cryptographic key represents the layered cryptographic key for encrypting this remaining data block and any duplicate data block into substantially equivalent data. In one example implementation, the remaining data block may be compressed prior to encryption, if possible, such as when this data block is not already of a compressed type.

Once compressed, encrypted and/or communicated to the network resource for storage, the deduplication service is precluded from accessing any original data (e.g., cleartext) in a secure data block. For one reason, differentiating between duplicate and non-duplicate data blocks for deduplication is performed independent of encryption and therefore, the deduplication service does not examine decrypted data block content in order to identify the duplicate data blocks. Only a computing device within a same domain controls encryption/decryption of the duplicate data block. One example implementation uses lookup hash values to identify the non-duplicate data blocks prior to the encryption of these data blocks. Another example implementation identifies the non-duplicate data blocks with lookup hash values that are computed on the encrypted data blocks.

According to one example implementation, a set of content-derived, layered cryptographic keys includes a symmetric encryption key for each deduplicated data block. For a particular undeduplicated data block, the example component generates the symmetric encryption key by computing a hash-based message authentication code (HMAC) using data block content and one example deduplication domain-based lookup key. Producing each symmetric encryption key from the data block content secures a corresponding encrypted data block from misappropriation while providing such a data block to authorized users. Each symmetric encryption key may be produced directly from data block content such that a lookup hash value is computed on the corresponding encrypted data block instead of the original data block, which provides additional protection from an untrusted resource.

The untrusted resource, generally, refers an adversarial computing device, including any resident software component executed therein, which desires access to unencrypted/clear data without authorization from an owner. To illustrate one example, an enterprise may acquire a set of configurable computing resources, by quantity or capability, from a network resource, which may be referred herein as a private/public/hybrid cloud resource. By arranging these computing resources, the network resource provides the enterprise with one or more hosted services, such as a deduplication service. In order to prevent another computing device and/or service connected to or hosted by from deciphering the encrypted data blocks, the enterprise employs a combination of the content-derived cryptographic keys and the deduplication domain-based cryptographic keys as described herein.

In one example implementation where the enterprise does not trust the network resource (e.g., a public cloud resource), the example component computes lookup hash values on the encrypted data blocks instead of the same data blocks in unencrypted/decrypted form. Accordingly, the deduplication service may validate the data blocks while these blocks remain encrypted by computing a separate hash-based authentication code on the encrypted data blocks for comparison with the previously computed lookup hash values. Hence, no unauthorized device or service (e.g., in another domain) running within the network resource is able to access unencrypted enterprise data when protected with the set of content-derived cryptographic keys.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data deduplication in general.

FIG. 1 is a block diagram illustrating an example system for secure deduplication according to one example implementation. One component of the example system includes a computing device 102 coupled to a network resource 104. A deduplication service 106 running within the network resource 104 is configured to eliminate redundant data blocks from file data 108 after encryption and/or compression.

According to one example implementation, a set of deduplication domain-based cryptographic keys 110 (herein referred to as the deduplication domain-based cryptographic keys 110) includes symmetric secret keys within a particular deduplication domain. As described herein, an example deduplication domain may refer to an entire enterprise or a specific group or sub-group with that enterprise as defined by the enterprise's computing environment administrator. Each such secret key, hence, may be used by each entity within that domain to encrypt and/or decrypt various data, such as the metadata 114, the authentication values 116, the chunk-derived cryptographic keys 118 and/or the like, in a manner that prevents a non-domain entity from deciphering the encrypted data while encrypting duplicate data blocks to the same encrypted data. A size (e.g., in bits) of the deduplication domain-based cryptographic may represent a cryptographic strength of a resulting encrypted data.

An integration component 112 is configured to use any of these domain-based keys to produce a hash-based authentication code, for example, a hash-based message authentication code (HMAC), for validating various data corresponding to one or more data blocks of the file data 108, including the metadata 114 (e.g., an offset, a size in number of bytes and/or the like), lookup hash values and/or other cryptographic keys. The integration component 112 may store each hash-based authentication code as authentication values 116. Prior to storage on the network resource 104, for instance, the integration component 112 may use a symmetric encryption scheme-based mechanism and one of the deduplication domain-based cryptographic keys 110 to secure the metadata 114 and the authentication values 116.

The integration component 112 may use a first deduplication domain-based cryptographic key and an example data block's content to compute a first hash-based authentication code, which may be used as a lookup hash value for determining whether another data block is identical to that data block. The integration component 112 may use a second deduplication domain-based cryptographic key to compute a second hash-based authentication code based upon the lookup hash value. One example implementation designates the second hash-based authentication code as a symmetric cryptographic key for securing the example data block such that duplicate data blocks are encrypted using the same symmetric cryptographic key and therefore, encrypt to equivalent data blocks (e.g., referred to messages or ciphertexts). This is because data block content is used to generate the lookup hash value, which is specific to the example data block; and therefore, the symmetric cryptographic key encrypts the duplicate data blocks to substantially equivalent encrypted data blocks. For this reason, decrypting these encrypted data blocks, with the symmetric cryptographic key, results in substantially equivalent data blocks that are duplicates of the example data block.

The integration component 112 records the symmetric cryptographic key, in the content-derived cryptographic keys 118, as an appropriate encryption key for the example data block and/or any data block having identical content. According to one alternative implementation, the integration component 112 further secures the symmetric cryptographic key by symmetrically encrypting such a key with a third deduplication domain-based key to produce layered cryptographic keys, as described herein. The integration component 112 may also use the third deduplication domain-based cryptographic key to encrypt/decrypt the lookup hash values and/or data block offset and size attributes.

The following description refers to embodiments where the deduplication service 106 is running on a private cloud computing resource or an on-premises computing device to which the computing device 102 communicates secure data blocks comprising the file data 108 for storage. The integration component 112 is configured to use the deduplication service 106 to validate these data blocks in addition to preventing an untrusted resource outside of the domain from accessing and/or decoding the secure data blocks via symmetric key encryption schemes. The integration component 112 uses the deduplication service 106 and the third deduplication domain-based key to decrypt the encrypted content-derived cryptographic keys 118, which are then used to decrypt the secure data blocks. After reverting back to original data blocks, the integration component 112 uses the deduplication service 106 to compute a hash-based authentication code for each secure data block and each authentication code is compared with a corresponding lookup hash values. The integration component 112 may provide the corresponding lookup hash values prior to the above comparison or, alternatively, these values are stored, in encrypted form, at the public cloud resource or the on-premises cluster.

To illustrate embodiments comprising a hosted deduplication service in a public cloud resource, the integration component 112 may use the second deduplication domain-based cryptographic key to encrypt/decrypt data blocks prior to computing the lookup hash values. Instead of using the lookup hash value to generate the content-derived cryptographic key, the integration component 112 uses actual data block content. In this alternative implementation, the integration component 112 computed the lookup hash values from the encrypted data blocks in contrast to unencrypted/clear data blocks.

Figure 2:
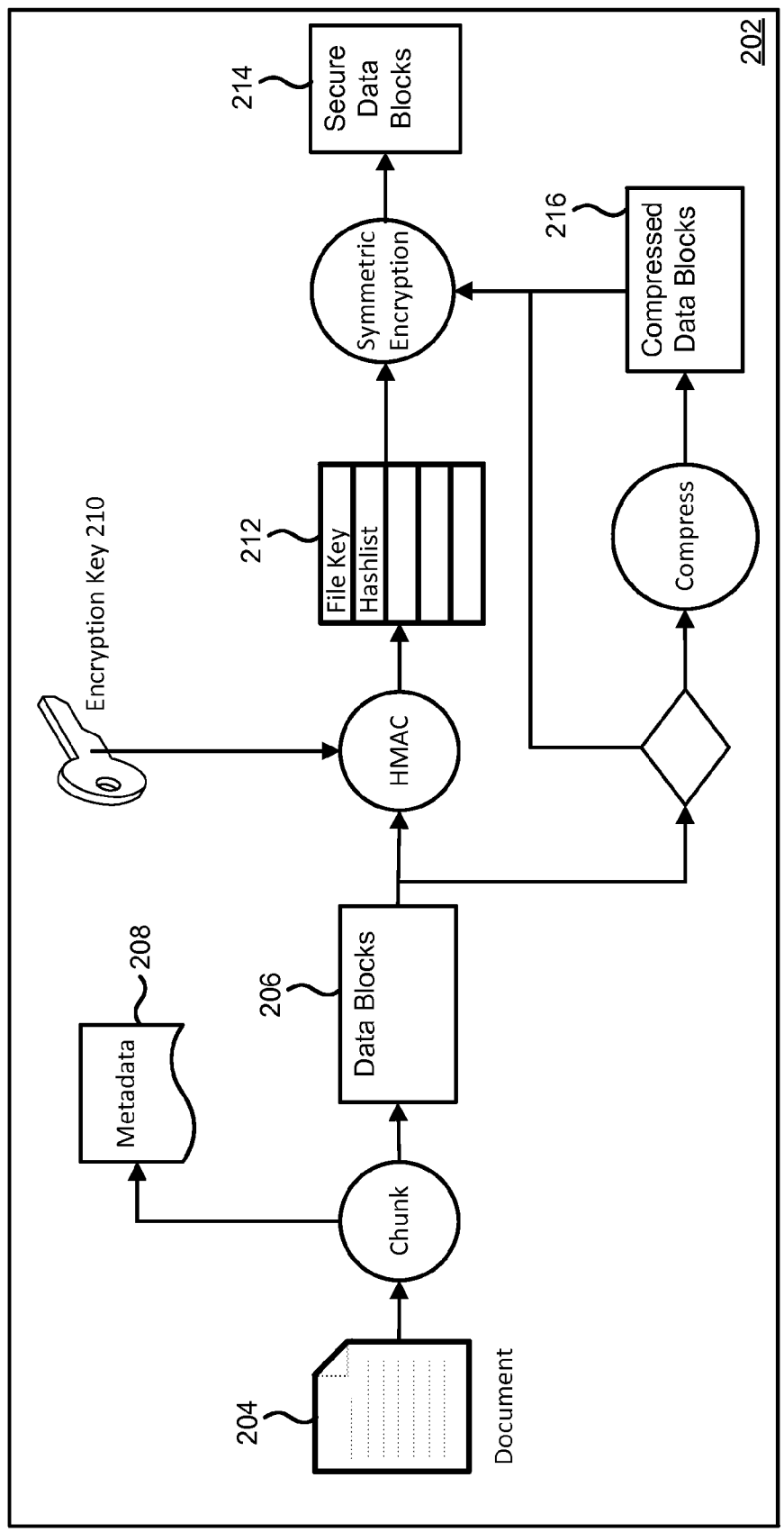
FIG. 2 is a functional block diagram illustrating an example process for securing data blocks of a file for deduplication according to one example implementation.
Figure 3:
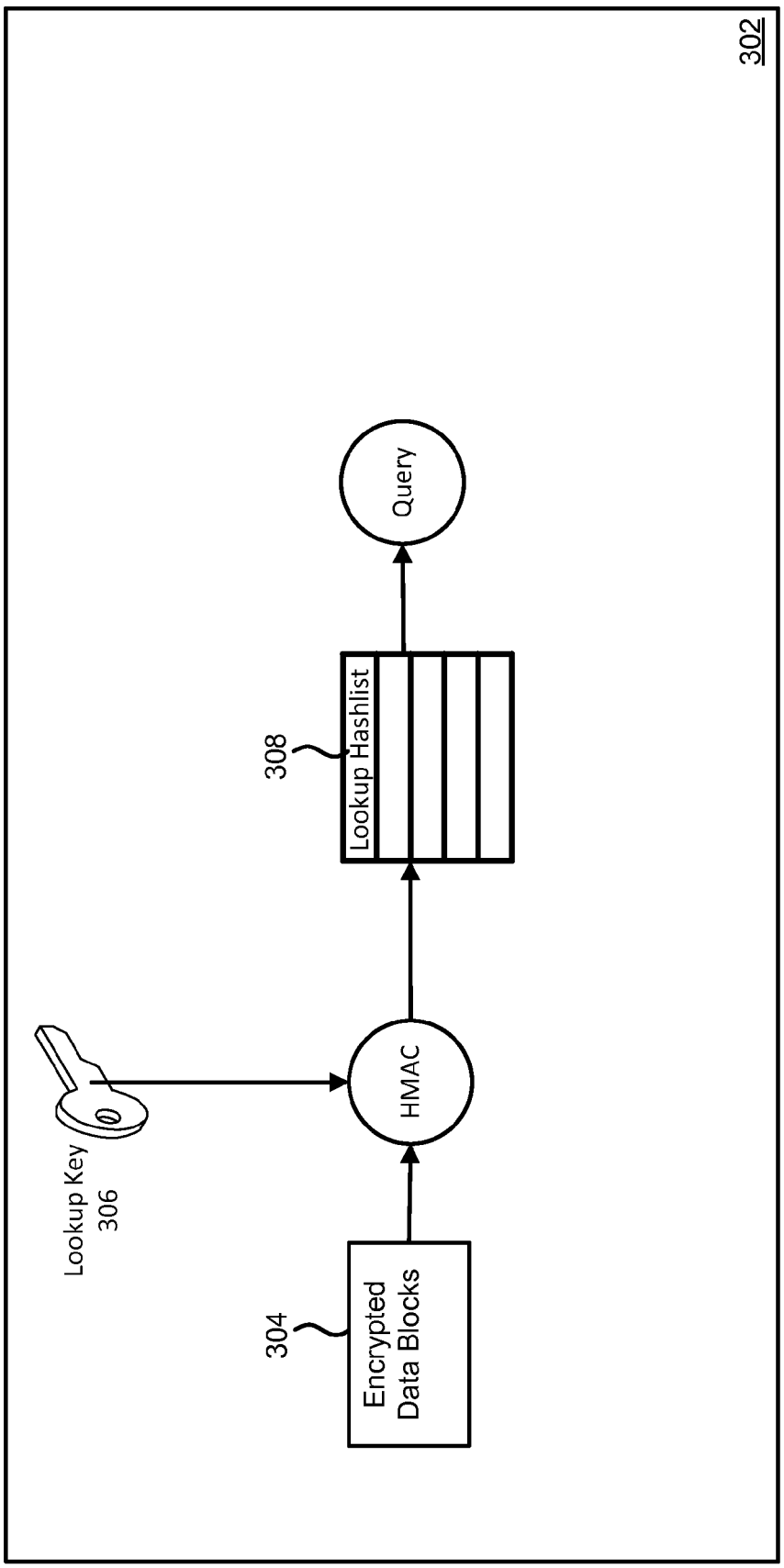
FIG. 3 is a functional block diagram illustrating an example process for computing authentication values for data blocks according to one example implementation.
Figure 4:
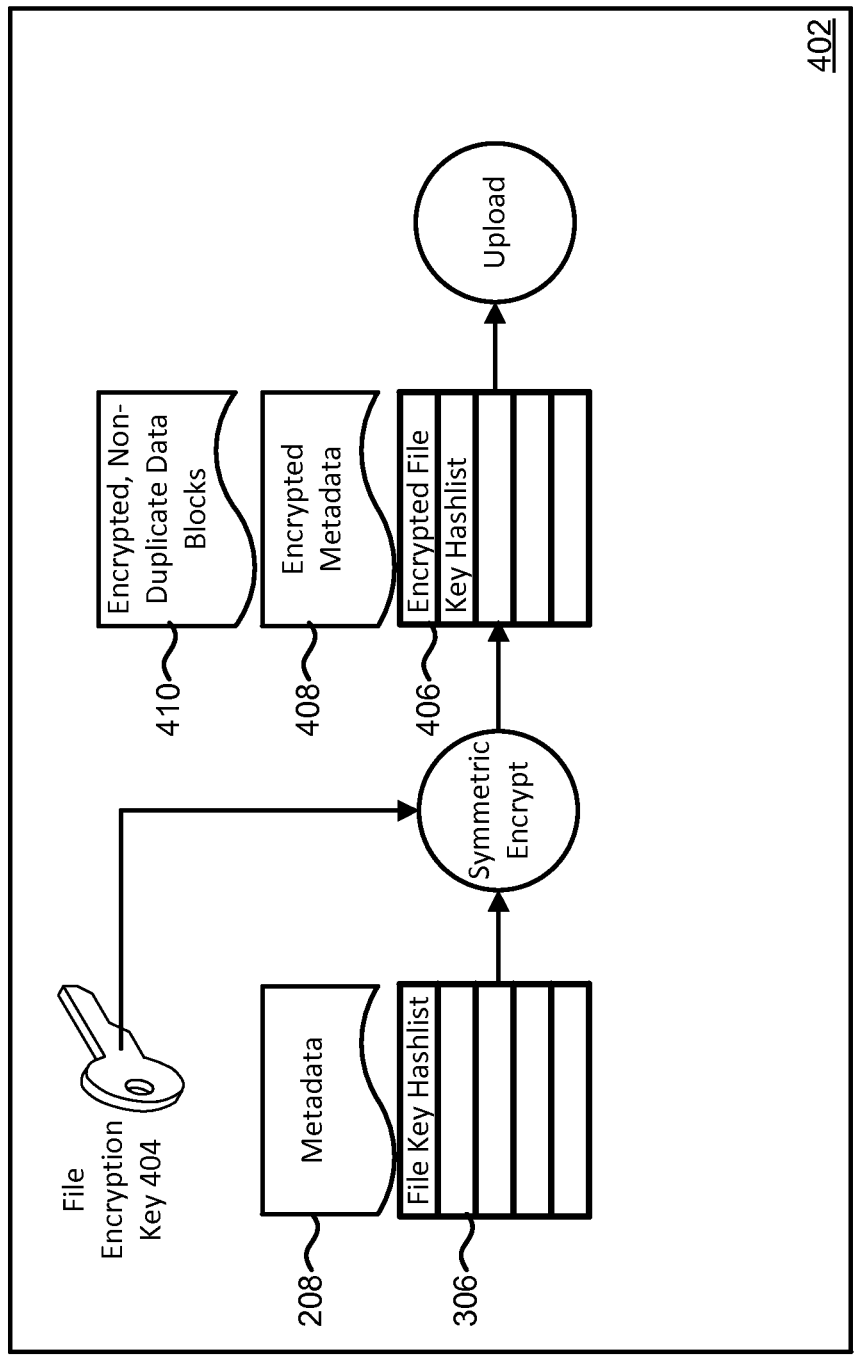
FIG. 4 is a functional block diagram illustrating an example process for uploading at least a portion of a deduplicated file according to one example implementation.

The integration component 112 may operate in a number of phases through which deduplication and encryption are achieved within one pipeline. Optionally, the integration component 112 incorporate compression into the pipeline by compressing data blocks prior to encryption and transmission to the network resource for storage. FIGS. 2-4 illustrate such an example pipeline involving three (3) phases.

FIG. 2 is a functional block diagram illustrating an example process for securing data blocks of a file for deduplication according to one example implementation. The example process may represent a portion or phase 202 of a deduplication and encryption integration mechanism as described herein by which a software/hardware component (e.g., the integration component 112 of FIG. 1) transforms lookup hash values into symmetric data block content-derived cryptographic keys for securing corresponding undeduplicated data blocks. These data blocks may be compressed prior to encryption via such content-derived cryptographic keys.

According to one example implementation, the example process performs a chunking operation (labeled "Chunk" in FIG. 2) to partition a document 204 into a plurality of data blocks 206 (herein referred to as the data blocks 206) and metadata 208. Each of the data blocks 206 may include multiple data bytes of a variable or fixed block length. Using an encryption key 210 and a hash-based encryption mechanism (labeled "HMAC"), the example process transforms data block content into a hash-based authentication code. The example process of FIG. 2 proceeds to store each computed hash-based authentication code in a file key hashlist 212 for use as a content-derived cryptographic key in encrypting/decrypting a corresponding undeduplicated data block. Using these content-derived cryptographic keys, which may be generated in accordance with a symmetric secret key encryption scheme and/or defined in scope by a specific deduplication domain, the example process of FIG. 2 transforms the data blocks 206 into secure data blocks 214.

Producing each content-derived cryptographic key from (e.g., unencrypted) data block content secures such content from misappropriation while enabling duplicate data blocks to encrypt to a substantially equivalent data block. Accordingly, the deduplication service stores duplicate data blocks if these data blocks are encrypted using different domain-based cryptographic keys; in which case, such redundancy ensures that only authorized domain entities can view existence information or access data, such as metadata, secured with a same domain-based cryptographic key. Thus, an adversary cannot use lookup hash values to determine if a particular data block exists without the domain-based cryptographic key.

As an alternative, the example process of FIG. 2 computes a first hash-based authentication code (e.g., HMAC) based upon the data block content and uses that authentication code as input for generating a second hash-based authentication code to be used as the content-derived cryptographic key. The first hash-based authentication code and the second hash-based authentication code may be computed using same or different domain-based cryptographic keys. As an example, the first hash-based authentication code includes a lookup hash value that is computed on unencrypted data block content. The second hash-based authentication code secures the lookup hash value from being compromised, thus ensuring data integrity when a corresponding data block is downloaded. For instance, an adversary attempting to surreptitiously provide incorrect data block content to the user via a fraudulent lookup hash value will be unable to successfully manipulate the second hash-based authentication code without the appropriate domain-based cryptographic key.

In order to reduce data transmission size and/or network resource storage, the data blocks, the data blocks 206 may be compressed prior to encryption. After performing a compression operation, the example process of the phase 202 transforms compressed data blocks 216 into the secure data blocks 214, according to one alternative implementation. The example process of FIG. 2 symmetrically encrypts the compressed data blocks 216 using corresponding keys from the file key hashlist 212 and produces the secure data blocks 214 for uploading to the network resource.

FIG. 3 is a functional block diagram illustrating an example process for computing authentication values for data blocks according to one example implementation. The example process may represent a portion or phase 302 of a deduplication and encryption integration mechanism, as described herein, by which a software/hardware component (e.g., the integration component 112 of FIG. 1) transforms encrypted data blocks 304 into hash-based authentication codes referred to herein as lookup hash values. The encrypted data blocks 304 may refer to at least a portion of a deduplicated file. Each unencrypted data block of the deduplicated file may be encrypted in accordance with the example process described for FIG. 2. Using the lookup hash values, such a component may use query a deduplication service to determine which of the encrypted data blocks 304, if any, are redundant (e.g., duplicates of previously deduplicated data blocks) and which data blocks are new and are to be uploaded.

Using a lookup key 306 and a hash-based encryption mechanism (labeled "HMAC"), the example process transforms encrypted data block content into a lookup hashlist 308 comprising a lookup hash value for each encrypted data block. As described herein, the lookup key 306 may be a cryptographic key generated in accordance with a symmetric secret key encryption scheme and defined in scope by a specific deduplication domain. The lookup key 306 ensures that no adversary, including the network resource, can generate lookup hash values from a dictionary of data blocks and probe the lookup hashlist 308 for matching data blocks.

By comparing lookup hash values in the lookup hashlist 308 with stored lookup hashes for previously deduplicated data blocks, the deduplication service may identify duplicate data blocks stored in a network resource, such as a private/public/hybrid cloud resource or on-premises server computing device. A computing device may query the deduplication service as to the existence of certain data blocks in storage to which the deduplication service responds with lookup hash values of undeduplicated data blocks, if any. Generally, the undeduplicated data blocks refer to data blocks without duplicates in the network resource. If the deduplication service indicates that all of the encrypted data blocks 304 are redundant, the example process of the phase 302 ends because none of the encrypted data blocks 304 need to be uploaded in order for the document 204 to be stored at the network resource.

Producing each lookup hash value from encrypted data block content precludes the deduplication service running on the network resource, or any other computing device, from accessing decrypted content. Accordingly, the deduplication service may identify deduplicated data blocks without decrypting the data block content. The deduplication service also may use the lookup hash values to validate a previously deduplicated data block, which, for instance, became tainted or corrupted data block. To illustrate, even if the deduplication service indicates a matching lookup hash value for an example requested encrypted data block, there is a possibility that a matching deduplicated data block is corrupted and/or uploaded by an adversary. To validate the matching deduplicated data block's integrity, another hash value is computed on the encrypted data block content from that data block with the same cryptographic key used to compute the lookup hash value. By comparing the other hash value with the lookup hash value generated by the example process of FIG. 2, the deduplication service determines whether the matching deduplicated data block includes correct data and if so, communicates that data block to the user's computing device. If these hash value do not match, the deduplication service stops the matching deduplicated data block from being downloaded because that data block is most likely compromised/corrupted.

FIG. 4 is a functional block diagram illustrating an example process for uploading at least a portion of a deduplicated file according to one example implementation. The example process may represent a portion or phase 402 of a deduplication and encryption integration mechanism as described herein by which a software/hardware component (e.g., the integration component 112 of FIG. 1) encrypts symmetric content-derived cryptographic keys, lookup hash values, data block offsets and size attributes and other data for securing encrypted data blocks prior to communication to a deduplication service running on a network resource.

As described herein, one example purpose for re-encrypting certain data, including the content-derived cryptographic keys and/or the lookup hash values, is to protect such data from inappropriate access by an untrusted resource, which may include an adversarial computing device outside of a deduplication domain. One example untrusted resource includes another entity connected to the network resource, such as when different domain members may access commonly available services running on a private cloud resource or on-premises computing cluster. An alternative untrusted resource may be a third-party hosted deduplication service running on a public cloud resource, on which data from other domains and/or other organizations also are stored.

FIG. 4 depicts one example implementation of the phase 402 that follows the phase 202 where the key hashlist 212 is generated to include content-derived cryptographic keys, as described for FIG. 2, and the phase 302 where the lookup hashlist 308 is generated, as described for FIG. 3. After determining which data blocks of the deduplicated file are duplicates and which are non-duplicates, the example process of FIG. 4 generates the metadata 208 comprising offset information for each non-duplicate data block. Using a file encryption key 404 (e.g., a user password), the example process of the phase 402 proceeds to transform the file key hashlist 306 and the metadata 208 into an encrypted file key hashlist 406 and encrypted metadata 408, respectively. Such a transformation may be accomplished using any mechanism implementing a symmetric key encryption scheme. The phase 402 is completed after uploading encrypted, non-duplicate data blocks 410, the encrypted file key hashlist 406 and the encrypted metadata 408 to the network resource.

Because the file encryption key is user specified, the encrypted file key hashlist 406 and the encrypted metadata 408 are unlikely to be decoded by an adversary and furthermore, allow a domain user to decrypt such data on a client computing device, identify certain data blocks of the document 204, and reconstruct a file data stream by concatenating at least one data stream comprising data blocks for at least a portion of the document 204 using a metadata stream (e.g., a steam map) comprising data block offset and/or size attributes. Furthermore, the deduplication service may be instructed to use the lookup hash values to validate the certain data blocks for maintaining data integrity.

Figure 5:
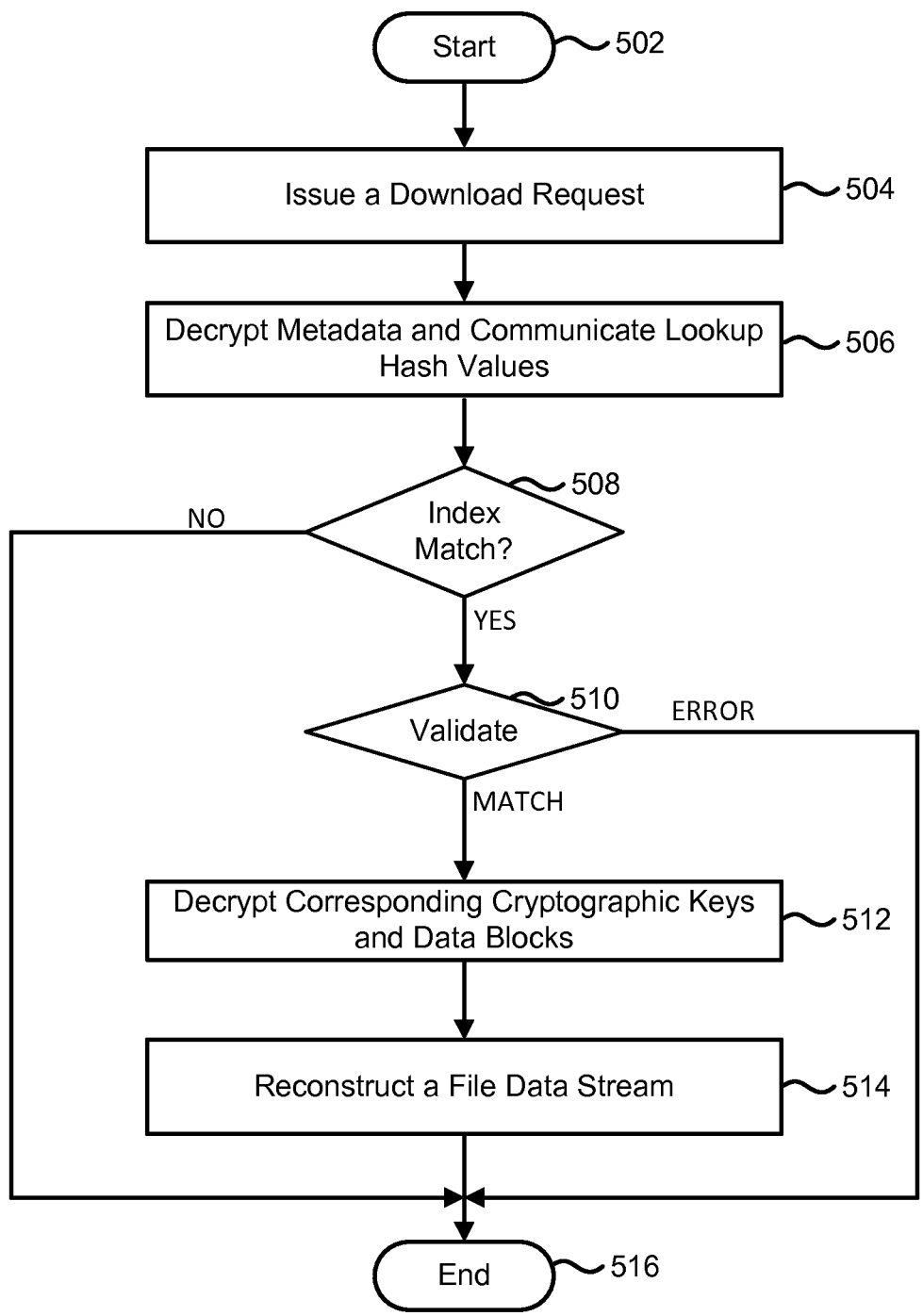
FIG. 5 is a flow diagram illustrating example steps for downloading secure file data from a network resource according to one example implementation.

FIG. 5 is a flow diagram illustrating example steps for downloading secure file data from a network resource according to one example implementation. The example steps may be executed after a deduplication service removes redundancies from the file data and uploads only non-duplicate data blocks, if any, to the network resource.

One or more software/hardware components (e.g., the integration component 112 of FIG. 1) of a deduplication and encryption integration mechanism, as described herein, may initiate the example steps, which commence at step 502 and proceed to step 504, by issuing a download request to the deduplication service. One example component running on a computing device coupled to the network resource may communicate the download request for at least a portion of the secure file data. In response, the deduplication service may return metadata associated with the secure file data, which is used to select and/or download one or more secure data blocks, as described further below with respect to steps 506 to 516 of FIG. 5.

Step 506 decrypts the returned metadata, identifies one or more secure data blocks to download and communicates corresponding lookup hash values to the deduplication service. In response to an inputted password (e.g., the file encryption key 404 of FIG. 4), the example component permits a user to access to the returned metadata according to one example implementation. It is appreciated that the "user" described herein may refer to a specific role performed by a group of users. The metadata includes a data stream map between the secure data blocks and offset/size attributes from which the example component may determine which secure data blocks are to be downloaded. The one or more secure data blocks may comprise an entire file or only a portion needed of a file. A secure data block, generally, refers to an encrypted data block that is stored at the network resource. Each secure data block may be encrypted using a corresponding content-derived cryptographic key, which may be referred to as a layered encryption key due to being generated with a deduplication domain-based cryptographic key.

Step 508 determines whether the corresponding lookup hash values match any hash values in a deduplication hash index. The deduplication service, in one example implementation, persists a lookup hash value associated with each deduplicated data block in the deduplication hash index. By maintaining such an index, the deduplication service may determine whether the one or more secure data blocks are stored in the network resource without re-computing a previously deduplicated data block's lookup hash value.

Step 510 represents secure data block validation. Without being decrypted, an example secure data block may be examined for data integrity via a relevant authentication technique. For instance, the deduplication service verifies data integrity by computing a separate hash authentication code based upon a deduplication domain-based lookup key and encrypted data block content from the secure data block and compares that authentication code with the example secure data block's lookup hash value, as provided during step 506. A match between these values indicates a correct secure data block while a mismatch implies incorrect data in the secure data block. If step 510 determines that the one or more secure data blocks are valid based upon hash authentication codes, step 510 proceeds to step 512. If step 510 cannot validate the one or more data blocks, step 510 issues an error and terminates the example steps at step 516.

Step 512 is directed towards decrypting the content-derived cryptographic keys and the one or more secure data blocks. Some example implementations involve the deduplication service communicating the encrypted content-derived cryptographic keys and the one or more secure data blocks to the computing device and the example component decrypting each at the computing device. Other example implementations, including those involving a public/private/hybrid cloud resource, select an appropriate deduplication domain-based symmetric key to the deduplication service in order to first decrypt the content-derived cryptographic keys and then, the one or more secure data blocks using the content-derived cryptographic keys.

Step 514 refers to reconstructing a file data stream comprising the one or more secure data blocks for communication to the computing device. To illustrate one example, the example component instructs the deduplication service as to an ordering of the one or more secure data blocks within the requested file, as indicated by the returned metadata. In response, the deduplication service may return the requested portion of the file data in the form of a reconstructed file data stream comprising the secure data blocks. Using offset information, the deduplication service may locate and then, concatenate individual encrypted data blocks into one or more data streams that are transmitted to the computing device. Step 514 proceeds to step 516 where the example steps depicted in FIG. 5 end.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
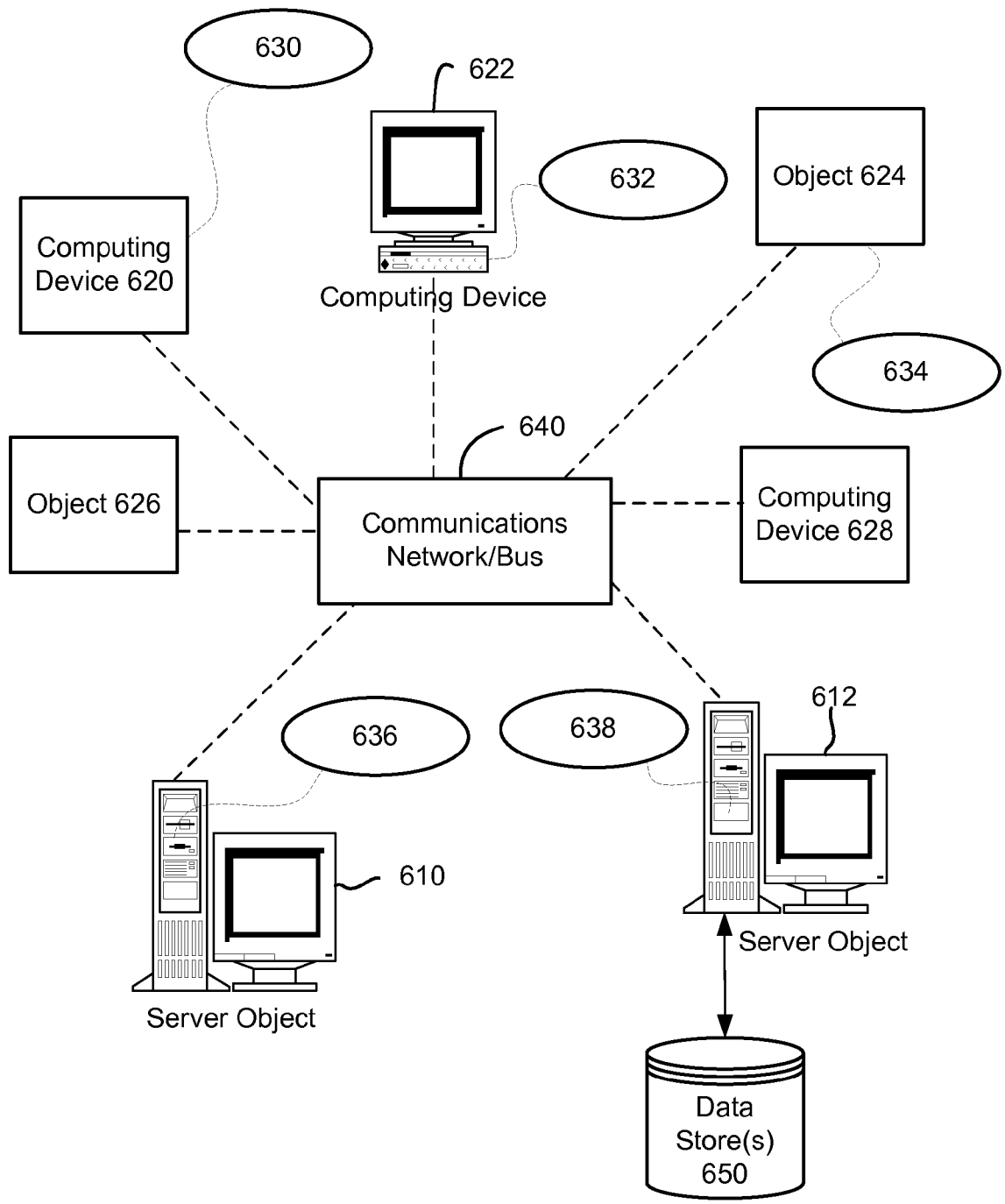
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
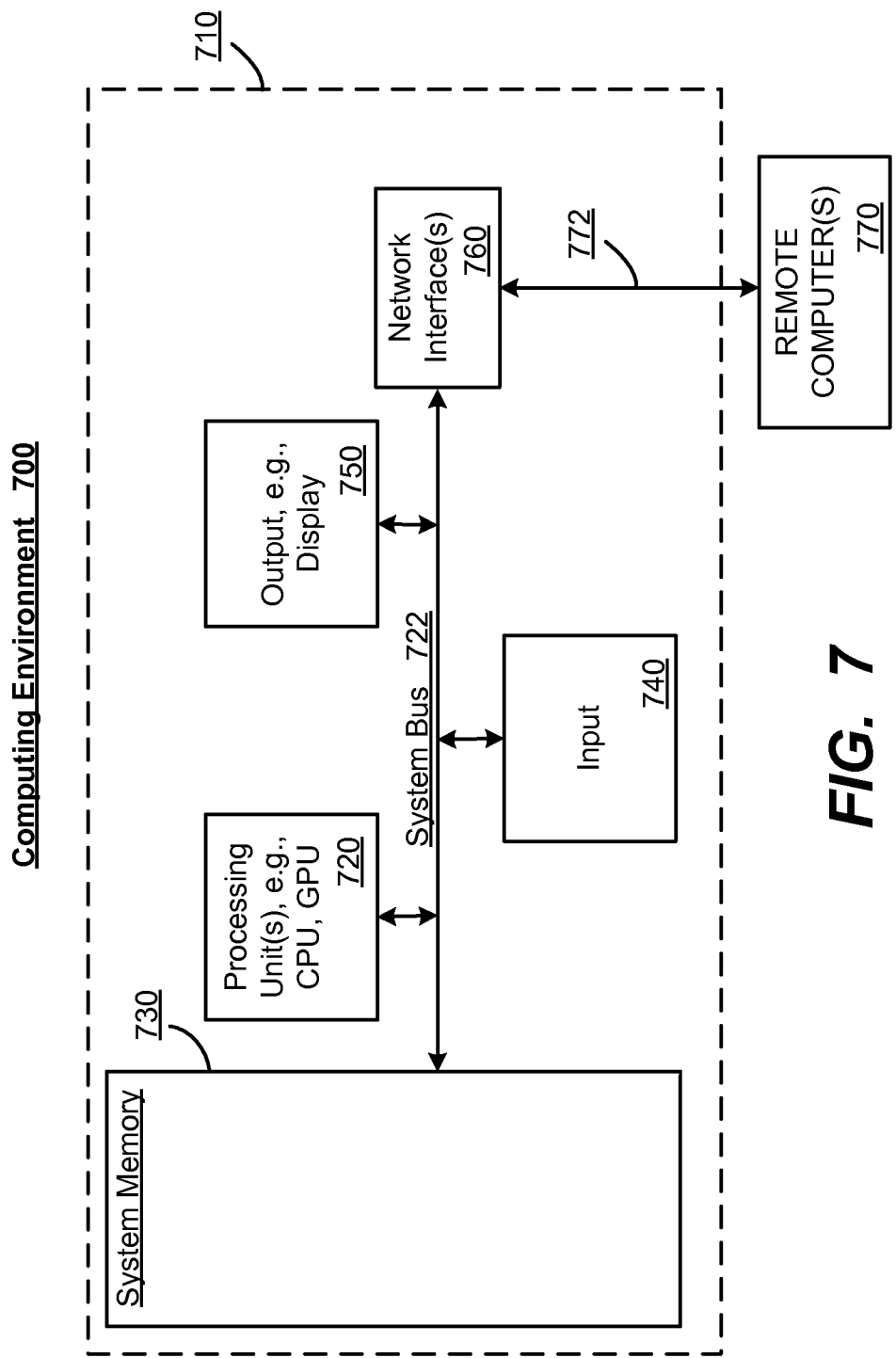
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. in a computing environment, a method performed at least in part on at least one processor, comprising:
    integrating encryption and deduplication for at least one computing device, including, processing at least one data block corresponding to a file or a stream for deduplication;
    generating a set of cryptographic keys based upon content of the at least one data block and at least one deduplication domain-based cryptographic key, wherein generating the set of cryptographic keys further comprises:
        computing a first hash-based authentication value using a first deduplication domain-based cryptographic key of the at least one deduplication domain-based cryptographic key;
        generating a second hash-based authentication value using a second deduplication domain-based cryptographic key of the at least one deduplication domain-based cryptographic key and the first hash-based authentication value; and encrypting a lookup hash value using a third deduplication domain-based cryptographic key of the at least one deduplication domain-based cryptographic key; and encrypting the at least one data block using the set of cryptographic keys to produce at least one encrypted data block, wherein the at least one encrypted data block is identifiable without decrypting content of the at least one encrypted data block.

2. The method of claim 1, wherein the first hash-based authentication value and the second hash-based authentication value are computed using different deduplication domain-based cryptographic keys.

3. The method of claim 1, further comprising:
computing the lookup hash value for the at least one encrypted data block using the at least one deduplication domain-based cryptographic key.

4. The method of claim 1, further comprising:
encrypting the set of cryptographic keys and metadata using at least one password, the metadata defining an offset and a size for each encrypted data block.

5. The method of claim 4, further comprising, communicating the at least one encrypted data block, the set of cryptographic keys and the metadata to a network resource.

6. The method of claim 1, further comprising:
compressing the at least one data block prior to encrypting the at least one data block.

7. The method of claim 1, wherein generating the set of cryptographic keys further comprises:
generating a content-derived encryption key for each of the at least one data block.

8. The method of claim 1, further comprising:
computing the lookup hash value for the at least one data block using data block content and a symmetric secret key within a deduplication key domain.

9. The method of claim 1, further comprising;
downloading at least a portion of the file from a network resource.

10. The method of claim 1, further comprising:
computing the lookup hash value and a content-derived cryptographic key for the at least one encrypted data block using the at least one deduplication domain-based key and data block content.

11. In a computing environment, a system comprising:
an integration component running within a computing device coupled to a network resource comprising:
a deduplication service, the integration component being configured to issue a file download request comprising data block metadata for one or more encrypted data blocks and instructing the deduplication service to process offset information in the data block metadata, locate the one or more encrypted data blocks within the network resource using the offset information, and communicate the one or more encrypted data blocks, the integration component being further configured to use a set of deduplication domain-based keys to decrypt content-derived cryptographic keys and use the decrypted content-derived cryptographic keys to decrypt the one or more encrypted data blocks, the set of deduplication domain-based keys including a first deduplication domain-based cryptographic key used to compute a first hash-based authentication value, a second deduplication domain-based cryptographic key used to generate a second hash-based authentication value, and a third deduplication domain-based cryptographic key to encrypt a lookup hash value, wherein at least one of the one or more encrypted data blocks are identifiable without decrypting content of the at least one of the one or more encrypted data blocks.

12. The system of claim 11, wherein the integration component is further configured to:
use the deduplication service to reconstruct a file using a data stream comprising the one or more encrypted data blocks and the data block metadata.

13. The system of claim 11, wherein the integration component is further configured to:
download file metadata, decrypt the file metadata with a user credential, identify at least one data block of the file that is not present in the computing device, and access the offset information and the content-derived cryptographic keys from the file metadata that corresponds to the one or more encrypted data blocks.

14. The system of claim 11, wherein the integration component is further configured to:
instruct the deduplication service to validate a data block using a corresponding lookup hash value.

15. The system of claim 11, wherein the deduplication service is further configured to:
provide encrypted content-derived cryptographic keys and at least one of the one or more encrypted data blocks that correspond to the data block metadata.

16. The system of claim 14, wherein the deduplication service is instructed to validate the lookup hash value or the one or more encrypted data blocks using a deduplication domain-based cryptographic key.

17. The system of claim 11, wherein the integration component is further configured to:
query the deduplication service using one of the first has-based authentication value and the second hash-based authentication value to determine whether at least one of the one or more encrypted data blocks is a duplicate data block.

18. In a computing environment, a method performed at least in part on at least one processor comprising:
integrating encryption and deduplication for at least one computing device, including:
generating a lookup hash value based on a first deduplication domain-based cryptographic key and content of a data block;
using a second deduplication domain-based cryptographic key to compute a symmetric cryptographic key based upon the lookup hash value;
encrypting the data block using the symmetric cryptographic key to produce an encrypted data block; and
encrypting the symmetric cryptographic key based on a third deduplication domain-based cryptographic key to produce a layered cryptographic key, the third deduplication domain-based cryptographic key is used to encrypt the lookup hash value, wherein one or more deduplicated data blocks are identifiable without decrypting the content of the one or more deduplicated data blocks.

19. The system of claim 11, wherein the first hash-based authentication value and the second hash-based authentication value are computed using different deduplication domain-based cryptographic keys.

20. The method of claim 18, wherein the first hash-based authentication value and the second hash-based authentication value are computed using different deduplication domain-based cryptographic keys.

* * * * *